Sept 10, 1957 N. O. DOKKEN 2,805,784
WAGON BOX CONSTRUCTION WITH SELF-UNLOADING MEANS
Filed Sept. 4, 1956 2 Sheets-Sheet 1
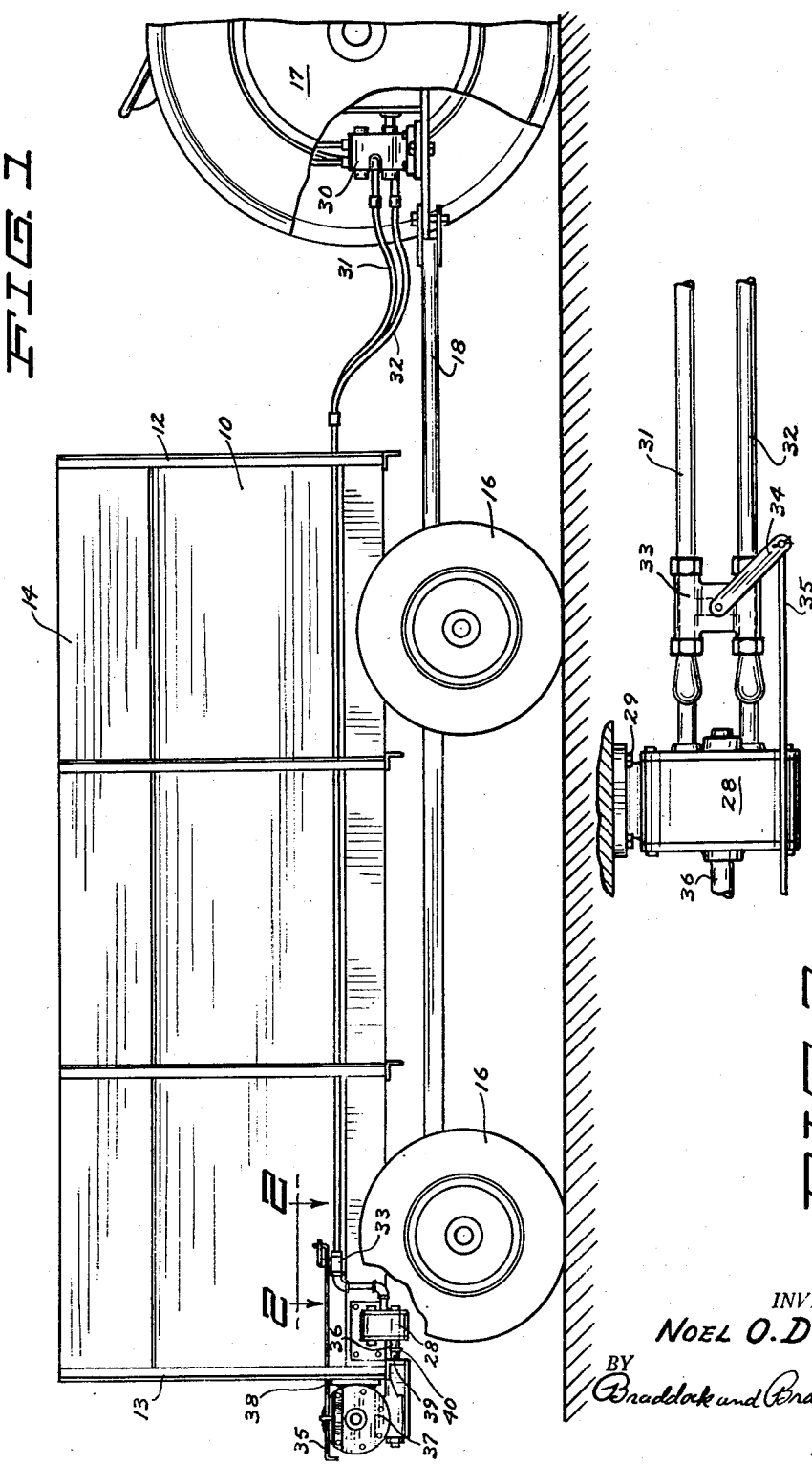
INVENTOR.
NOEL O. DOKKEN
BY Braddock and Braddock
ATTORNEYS Sept 10, 1957 N. O. DOKKEN 2,805,784
WAGON BOX CONSTRUCTION WITH SELF-UNLOADING MEANS
Filed Sept. 4, 1956 2 Sheets-Sheet 2
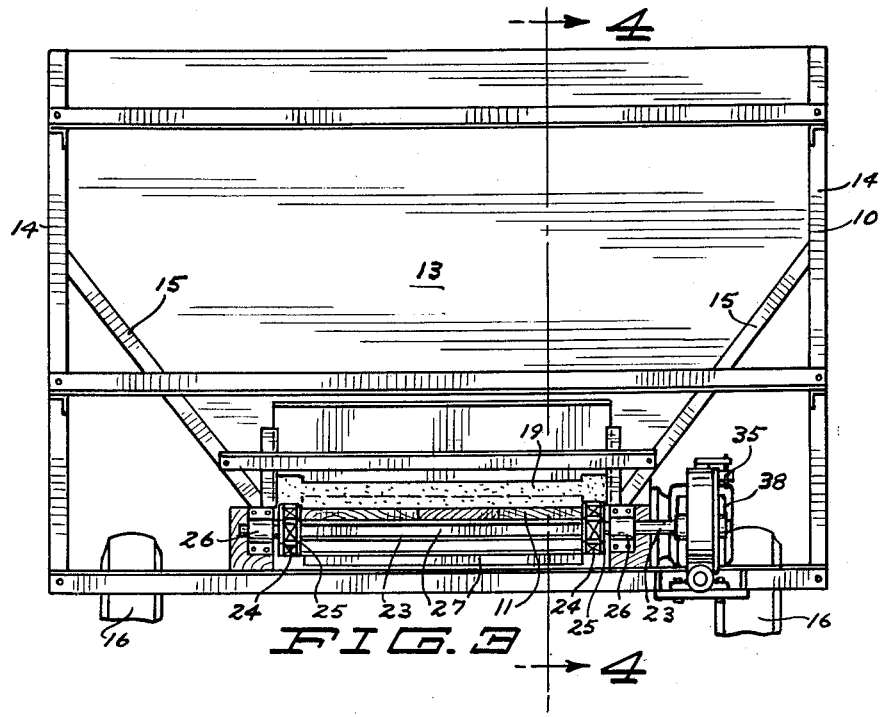
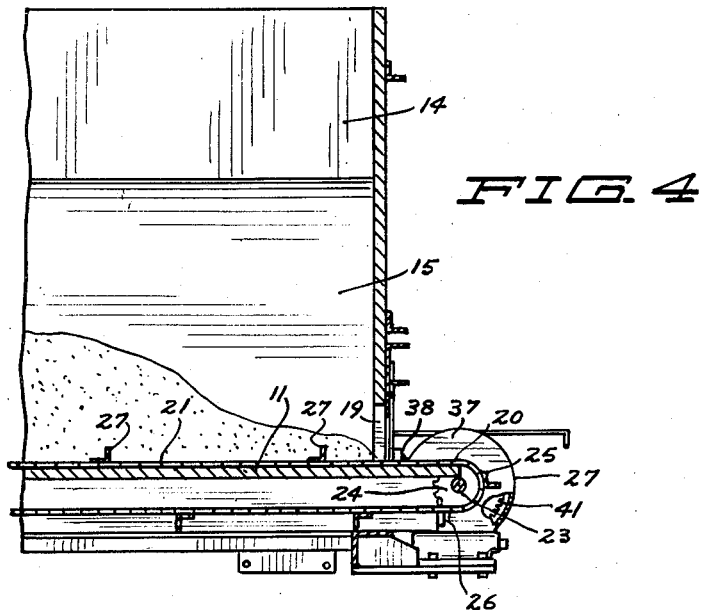
INVENTOR.
NOEL O. DOKKEN
BY
Braddock and Braddock
ATTORNEYS

United States Patent Office 2,805,784
Patented Sept. 10, 1957

2,805,784

WAGON BOX CONSTRUCTION WITH SELF-UNLOADING MEANS

Noel O. Dokken, Benson, Minn.

Application September 4, 1956, Serial No. 607,784

6 Claims. (Cl. 214—83.36)

The invention herein has relation to a wagon box construction consisting of a self unloading wagon box incorporating an endless conveyor belt and a power take-off drive therefor.

The object of the invention is to provide a wagon box construction which will be of simple, inexpensive, novel and improved construction.

In the accompanying drawings forming a part of this specification,

Fig. 1 is a side elevational view of a wagon box construction made according to the invention as when applied to use;

Fig. 2 is a detail sectional view, taken on line 2—2 in Fig. 1;

Fig. 3 is a rear elevational view of the wagon box construction; and

Fig. 4 is a sectional view, taken on line 4—4 in Fig. 3.

A wagon box 10 is constituted as a floor 11, front and rear walls, denoted 12 and 13, respectively, and side walls, each represented 14, which converge downwardly, as at 15.

Supporting wheels for the wagon box are indicated 16, and a tractor or towing vehicle 17 for the wagon is connected to a draw bar 18 thereof in ordinary or preferred manner.

A lower portion of the rear wall 13 of the wagon box is cut away to provide a rectangular opening 19 bounded at its lower side by the floor 11, and a portion 20 of the floor extends rearwardly of the rear wall 13.

An endless conveyor belt, constituted as transversely extending, interconnected links 21, has its forward end mounted on laterally spaced sprockets (not shown) fixedly supported upon a transverse shaft mounted in the wagon box and its rearward end mounted on laterally spaced sprockets 24 fixedly supported on a transverse shaft 23. Chains 25 ride said sprockets. Opposite end portions of the transverse shaft 23 are supported in bearings 26 on the wagon box. An upper length of the endless conveyor belt rides the floor 11 in covering relation to the whole of its area, and a lower length of said endless conveyor belt is situated beneath the floor. During operation of the endless conveyor belt to accomplish unloading of the wagon box its upper length moves rearwardly. Spaced, transverse flights 27 upon said endless conveyor belt are for transporting portions of the load, such, for example, as chopped hay, small grains, corn silage, ear corn, etc., rearwardly through the rectangular opening 19 thus to cause the portions to be dumped from the endless conveyor belt at the rear thereof.

A hydraulic motor 28 is supported, as at 29, upon an exterior part of the wagon at the lower, rear portion of one of its sides, the right side as shown, and said hydraulic motor is provided with operating fluid from a source, denoted 30, of fluid under pressure upon the tractor or towing vehicle 17. An outlet connection 31 extends from the source 30 to the hydraulic motor 28 and an inlet connection 32 extends from said hydraulic motor to said source. A by-pass valve 33 for controllably regulating the quantity and pressure of fluid delivered to the hydraulic motor is manually manipulatable by a lever 34 through the instrumentality of a rearwardly extending operating rod 35 accessible at the rear of the wagon. A longitudinal drive shaft 36 extends rearwardly from the hydraulic motor, and power transmitted to said longitudinal drive shaft is a function of the quantity and pressure of fluid entering said hydraulic motor. The maximum quantity and pressure of fluid will be delivered to the hydraulic motor when the by-pass control valve 33 is closed. The fluid will flow freely from the source to the by-pass control valve and back to the source, without appreciably affecting said hydraulic motor, when said by-pass control valve is wide open. And the quantity and pressure of fluid delivered to the hydraulic motor will be of magnitude predetermined by the size of the opening through the by-pass control valve when it is in partially open condition.

A gear unit 37 is supported upon the wagon box at the rear thereof by a mounting plate 38. The longitudinal drive shaft 36 of the hydraulic motor 28 is connected with a driven shaft 39, alined with said longitudinal drive shaft, by a flexible coupling 40. The transverse shaft 23 is situated centrally in the gear unit 37, and the driven shaft 39 propels said transverse shaft 23 through the instrumentality of gearing 41 of said gear unit.

The endless conveyor belt will be driven, in response to rotation of the longitudinal drive shaft 36, through the instrumentality of the driven shaft 39, gearing of the gear unit, the transverse shaft 23, the sprockets fixed on the forward transverse shaft and said transverse shaft 23 and the chains 25 on said sprockets.

A uniformly smooth and even and shockless flow of power can be obtained by employment of a construction and arrangement, including the power-take off drive as part thereof, as herein illustrated and described. Unloading can be as slow as may be desired at the commencement of unloading operations, and the rate of speed of unloading can be increased as unloading progresses. The rate of speed of unloading can be altered, increased or decreased, at will merely by manual manipulation of the by-pass control valve. There is capacity for an infinite number of variations of rate of speed of propulsion of the endless conveyor belt between maximum and minimum speeds.

Save for the inlet and outlet connections of the power-take off drive, there are no contrivances, with their attendant expense and liability of causing accidents, between the tractor or towing vehicle and the wagon box. The wagon box construction is simple and inexpensive and includes mechanisms all of which are supported directly on the wagon body and not liable to be the cause of accidents.

What is claimed is:

1. Wagon box construction comprising a wagon box, and endless conveyor thereon, a member for propelling said conveyor, a gear unit at the rear of and supported by said wagon box including gearing assembled with said member in driving relation thereto, a hydraulic motor at a side of and supported by the wagon box for receiving fluid from a source thereof under pressure, an inlet connection for passage of fluid from said source to said hydraulic motor, an outlet connection for passage of fluid from the hydraulic motor to the source, a by-pass control valve between said source and hydraulic motor including an opening for passage of fluid from said inlet connection to said outlet connection, means accessible at the rear of said wagon box for accomplishing manual manipulation of said by-pass control valve thus to alter, increase or decrease, the size of said opening, and a longitudinal drive shaft connected with said hydraulic motor and drivingly connected with said gearing.

2. The combination with a towing vehicle providing a source of hydraulic fluid under pressure, of a wagon box, an endless conveyor thereon, a member for propelling said conveyor, a gear unit supported by said wagon box including gearing assembled with said member in driving relation thereto, a hydraulic motor at a side of and supported by said wagon box, an inlet connection for passage of fluid from said source to said hydraulic motor, an outlet connection for passage of fluid from the hydraulic motor to the source, said inlet and outlet connections extending from said source longitudinally of said wagon box, and a drive shaft connected with said hydraulic motor and drivingly connected with said gearing.

3. The combination with a towing vehicle providing a source of hydraulic fluid under pressure, of a wagon box to be connected with said towing vehicle to be propelled thereby, an endless conveyor upon said wagon box member for propelling said conveyor, a gear unit supported by said wagon box including gearing assembled with said member in driving relation thereto, a hydraulic motor supported by the wagon box, an inlet connection for passage of fluid from said source to said hydraulic motor, an outlet connection for passage of fluid from the hydraulic motor to the source, said inlet and outlet connections extending from said source longitudinally of said wagon box exteriorly thereof, a by-pass control valve between the source and hydraulic motor including an opening for passage of fluid from said inlet connection to said outlet connection, means accessible at the rear of said wagon box for accomplishing manual manipulation of said by-pass control valve to alter the size of said opening, a shaft connected with said hydraulic motor to be driven thereby, and means drivingly connecting said shaft with said gearing.

4. Wagon box construction comprising a wagon box, an endless conveyor thereon, a member for propelling said conveyor, a gear unit supported by said wagon box including gearing assembled with said member in driving relation thereto, a hydraulic motor supported by the wagon box for receiving fluid from a source thereof under pressure, an inlet connection for passage of fluid from said source to said hydraulic motor, an outlet connection for passage of fluid from the hydraulic motor to the source, a by-pass control valve between said source and hydraulic motor including an opening for passage of fluid from said inlet connection to said outlet connection, means for accomplishing manual manipulation of said by-pass control valve thus to alter, increase or decrease, the size of said opening, and a drive shaft connected with said hydraulic motor and drivingly connected with said gearing.

5. The combination with a towing vehicle providing a source of hydraulic fluid under pressure, of a wagon box, an endless conveyor thereon, a member for propelling said conveyor, a gear unit supported by said wagon box including gearing assembled with said member in driving relation thereto, a hydraulic motor supported by said wagon box, an inlet connection for passage of fluid from said source to said hydraulic motor, an outlet connection for passage of fluid from the hydraulic motor to the source, said inlet and outlet connections extending from said source longitudinally of said wagon box, and a drive shaft connected with said hydraulic motor and drivingly connected with said gearing.

6. The combination with a towing vehicle providing a source of hydraulic fluid under pressure, of a wagon box to be connected with said towing vehicle to be propelled thereby, an endless conveyor upon said wagon box, a member for propelling said conveyor, a gear unit supported by said wagon box including gearing assembled with said member in driving relation thereto, a hydraulic motor supported by the wagon box, an inlet connection for passage of fluid from said source to said hydraulic motor, an outlet connection for passage of fluid from the hydraulic motor to the source, said inlet and outlet connections extending from said source longitudinally of said wagon box, a by-pass control valve between the source and hydraulic motor including an opening for passage of fluid from said inlet connection to said outlet connection, means for accomplishing manual manipulation of said by-pass control valve to alter the size of said opening, a shaft connected with said hydraulic motor to be driven thereby, and means drivingly connecting said shaft with said gearing.

References Cited in the file of this patent

UNITED STATES PATENTS

| | | |
|---|---|---|
| 2,099,981 | Joy | Nov. 23, 1937 |
| 2,499,792 | Starr | Mar. 7, 1950 |
| 2,595,395 | Lavelle et al. | May 6, 1952 |
| 2,670,836 | Ball | Mar. 2, 1954 |
| 2,687,680 | Heckathorn et al. | Aug. 31, 1954 |
| 2,743,705 | Johnson | May 1, 1956 |
| 2,765,937 | Elfes | Oct. 9, 1956 |